United States Patent

Ikeda

(10) Patent No.: US 8,513,459 B2
(45) Date of Patent: Aug. 20, 2013

(54) PROCESS FOR PRODUCING PERFLUOROPOLYETHER CARBOXYLIC ACID FLUORIDE

(75) Inventor: Sunao Ikeda, Ibaraki (JP)

(73) Assignee: Unimatec Co., Ltd., Tokyo (JP)

(*) Notice: Subject to any disclaimer, the term of this patent is extended or adjusted under 35 U.S.C. 154(b) by 1171 days.

(21) Appl. No.: 12/223,551

(22) PCT Filed: Feb. 1, 2007

(86) PCT No.: PCT/JP2007/051695
§ 371 (c)(1),
(2), (4) Date: Aug. 1, 2008

(87) PCT Pub. No.: WO2007/088929
PCT Pub. Date: Aug. 9, 2007

(65) Prior Publication Data
US 2009/0054687 A1 Feb. 26, 2009

(30) Foreign Application Priority Data

Feb. 1, 2006 (JP) ................................. 2006-024420

(51) Int. Cl.
*C08G 65/323* (2006.01)
*C08G 65/16* (2006.01)

(52) U.S. Cl.
USPC .......................................... 562/864; 562/849

(58) Field of Classification Search
None
See application file for complete search history.

(56) References Cited

U.S. PATENT DOCUMENTS 4,847,427 A 7/1989 Nappa
4,973,742 A * 11/1990 Ohsaka et al. ................ 560/184

FOREIGN PATENT DOCUMENTS

| JP | 60-202122 | 10/1985 |
|---|---|---|
| JP | 63-32812 | 7/1988 |
| JP | 63-43419 | 8/1988 |
| JP | 2-49027 | 2/1990 |
| JP | 05-301953 | 11/1993 |
| JP | 06-025405 | 2/1994 |
| JP | 09-031029 | 2/1997 |
| WO | WO 90/03353 | * 4/1990 |

* cited by examiner

*Primary Examiner* — Yevegeny Valenrod
(74) *Attorney, Agent, or Firm* — Brinks Hofer Gilson & Lione

(57) ABSTRACT

Perfluoropolyether carboxylic acid fluoride having the following general formula:

$$F(CF_2CF_2CF_2O)_nCF_2CF_2COF$$

(n: 2-200, preferably 35-70) can be produced by starting fluorination reaction of polyfluoropolyether carboxylic acid having the general formula as a tetrafluorooxetane polymer:

$$F(CH_2CF_2CF_2O)_nCH_2CF_2COF$$

(n: 2-200) in a dispersed state in a perfluoropolyether-based solvent with a fluorine gas at 50°-80° C., then slowly elevating the fluorination reaction temperature, and finally completing the fluorination reaction at 100°-120° C., where even in the case of fluorination reaction of the starting material with a high degree of polymerization the desired product can be produced in high yield, while suppressing the decomposition and keeping the high degree of polymerization substantially.

10 Claims, No Drawings

PROCESS FOR PRODUCING PERFLUOROPOLYETHER CARBOXYLIC ACID FLUORIDE

RELATED APPLICATIONS

The present application is a 35 U.S.C. §371 national stage filing of International Patent Application No. PCT/JP2007/051695, filed Feb. 1, 2007, to which priority is claimed under 35 U.S.C. §120 and through which priority is claimed under 35 U.S.C. §119 to Japanese Priority Patent Application No. 2006-024420, filed Feb. 1, 2006.

TECHNICAL FIELD

The present invention relates to a process for producing perfluoropolyether carboxylic acid fluoride, and more particularly to a process for producing perfluoropolyether carboxylic acid fluoride by fluorination of polyfluoropolyether carboxylic acid fluoride with a fluorine gas.

BACKGROUND ART

Perfluoropolyether carboxylic acid fluoride $F(CF_2CF_2CF_2O)n\text{-}CF_2CF_2COF$ can be produced by ring-opening polymerization of 2,2,3,3-tetrafluorooxetane in the presence of an alkali metal fluoride to form $F(CH_2CF_2CF_2O)nCH_2CF_2COF$, followed by fluorination with a fluorine gas.

Patent Literature 1: JP-B-63-32812
Patent Literature 2: JP-B-63-43419

Hydrogen fluoride HF is formed as a by-product by the reaction, and when the reaction temperature is elevated in the presence of such hydrogen fluoride, decomposition of etheral bond parts will take place to lower the degree of polymerization or the yield. To suppress such a decomposition it is necessary to lower the reaction temperature. The starting material $F(CH_2CF_2CF_2O)nCH_2CF_2COF$ is in a waxy or solid state at the ordinary temperature, depending on a degree of polymerization n, whose melting point is as high as about 80° C. To conduct the fluorination in a liquid state with a fluorine gas, the reaction temperature must be made higher.

This means that a much higher reaction temperature will be required with increasing degree of polymerization, and thus even if a starting material having a much higher degree of polymerization is used, the decomposition reaction is proceed in the end, so it is difficult to synthesize perfluoropolyether carboxylic acid fluoride having a desired higher degree of polymerization in good yield.

It is conceivable to use a solvent to conduct the reaction gently as a means of suppressing the decomposition reaction, which takes place during the fluorination reaction. So far available solvents for dissolving the starting material tetrafluorooxetane polymers are polar solvents, but the high polymers are hard to dissolve even in such solvents. At higher reaction temperatures, the solvents themselves can react with the fluorine gas and thus are hard to use in the fluorination reaction.

To trap hydrogen fluoride, which is caused the decomposition reaction, it is conceivable to conduct the fluorination in the presence of an alkali metal fluoride, but 2 molecules of hydrogen fluoride can be formed as a by-product per repeat unit —$CH_2CF_2CF_2$—, and to comply trap the hydrogen fluoride a large amount of alkali metal fluoride must be used with respect to the starting material. Furthermore, even if an equivalent weight of an alkali metal halide to the hydrogen fluoride is used, stirring will be hard to conduct, so smooth reaction will be hard to attain, and the yield will be inevitably lowered due to removal of the alkali metal halide by filtration, etc.

According to the afore-mentioned Patent Literature 2, the desired product can be obtained by conducting ultraviolet irradiation during the reaction to elevate the reactivity of hydrogen fluoride gas, thereby lowering the reaction temperature to about 100° to about 120° C. However, no examples of synthesizing perfluoropolyether carboxylic acid fluoride having a high degree of polymerization (n=about 40) are disclosed therein and the disclosed procedure of ultraviolet irradiation will require lamps of larger size, when the reactor is to be scaled up, also with a higher running cost, and thus is not suitable for the industrial scale production.

DISCLOSURE OF THE INVENTION

Problem to be Solved by the Invention

An object of the present invention is to provide a process for producing a perfluoropolyether carboxylic acid fluoride having the following general formula:

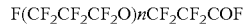
$F(CF_2CF_2CF_2O)nCF_2CF_2COF$ in high yield by fluorinating polyfluoropolyether carboxylic acid fluoride having the following general formula as a tetrafluorooxetane polymer with a fluorine gas:

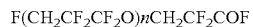
$F(CH_2CF_2CF_2O)nCH_2CF_2COF$ while suppressing decomposition of the starting material tetrafluorooxetane polymer of a high degree of polymerization even during the fluorination reaction, thereby keeping the high degree of polymerization substantially.

Means for Solving the Problem

The object of the present invention can be attained by a process for producing a perfluoropolyether carboxylic acid fluoride having the following general formula:

$F(CF_2CF_2CF_2O)nCF_2CF_2COF$ (n: 2-200)

by starting fluorination reaction of polyfluoropolyether carboxylic acid fluoride having the following general formula:

$F(CH_2CF_2CF_2O)nCH_2CF_2COF$ (n: 2-200)

as dispersed in a perfluoropolyether-based solvent at 50°-80° C. with a fluorine gas, slowly elevating the fluorination reaction temperature, and completing the fluorination reaction finally at 100°-120° C.

Effect of the Invention

According to the present process, a desired perfluoropolyether carboxylic acid fluoride having the following general formula:

$F(CF_2CF_2CF_2)nCF_2CF_2COF$ (n: 2-200, preferably 35-70)

can be produced in high yield by suppressing decomposition of polyfluoropolyether carboxylic acid fluoride having the following general formula:

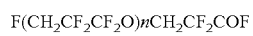
$F(CH_2CF_2CF_2O)nCH_2CF_2COF$ in the fluorination reaction with a fluorine gas, thereby keeping a high degree of polymerization substantially. The resulting perfluoropolyether carboxylic acid fluoride has distinguished heat resistance, chemical resistance, etc. and thus is suitable for use as a reaction solvent, a heating medium, a lubricating oil, etc.

BEST MODES FOR CARRYING OUT THE INVENTION

Polyfluoropolyether carboxylic acid fluoride as a starting material is in a waxy or solid state at the ordinary temperature, as mentioned before, and thus when the reaction is carried out at low temperatures, stirring is quite difficult to conduct. Thus, the starting material can be pulverized and dispersed into a solvent. In that case, the starting material can be finely pulverized by a pulverizer and charged into a reactor together with a solvent, where the number of steps will be increased and material loss will be inevitably increased at the same time. That is, such a procedure for dispersing the starting material into a solvent is not practical.

Actually, the starting material pulverized to some degree and a perfluoropolyether-based solvent are charged together into a reactor, and heated to higher temperatures (about 100° to about 110° C.) than the melting point of the starting material while conducting stirring, thereby once dissolving the starting material into the solvent, and then the solution temperature is slowly lowered to lower temperatures than the melting point, while conducting vigorous stirring, whereby the starting material not in a powdery state but rather in a paste state can be uniformly into the solvent, so the stirring can be carried out even at low temperatures.

Polyfluoropolyether carboxylic acid fluoride can be subjected to fluorination reaction upon dispersion into a perfluoropolyether-based solvent in a stirrable state. The perfluoropolyether solvent for use in the fluorination reaction includes those having such a boiling point as not to be evaporated off to the outside of the system as vapors during the fluorination reaction, such as the following hexafluoropropene oxide polymers, perfluoropolyethers or their derivatives:

$$CF_3CF_2CF_2O[CF(CF_3)CF_2O]nCF(CF_3)X$$

(where X: F or COF, and n: 2-30, preferably 3-9)

$$F(CF_2CF_2CF_2O)nCF_2CF_2Y$$

(where Y: F or COF, and n: 2-30, preferably 5-12)
The perfluoropolyether-based solvent can be used in a proportion of about 1 to about 20 parts by weight, preferably about 2 to about 5 parts by weight, on the basis of one part by weight of the starting material.

When such a reaction solvent is used, an alkali metal fluoride can be used to trap the by-produced hydrogen fluoride. That is, the solvent can likewise disperse the alkali metal halide, thereby enabling the stirring to conduct and further preventing the decomposition. These are additional merits.

The alkali metal halide for use as a hydrogen fluoride-trapping agent includes, for example, LiF, NaF, KF, CsF, RbF, etc., where NaF is preferable for use because of significant economy and easy availability. Particularly, finely, pulverized alkali metal halide has a good dispersibility and thus is appropriate. The hydrogen fluoride-trapping agent can be used in a proportion of about 0.1 to about 10 parts by equivalent weight, preferably about 0.1 to about 2 parts by equivalent weight on the basis of one part by equivalent weight of HF generated from the starting material oxetane polymer.

The reaction temperature is also an important factor for suppressing the decomposition reaction. Dispersion of the starting material into the afore-mentioned solvent can make the reaction temperature of the initial stage lower. At the initial stage of the reaction the number of hydrogen atoms to be fluorinated is larger, so the reaction proceeds vigorously to release much heat at the same time. Thus, the reaction with a fluorine gas must be started at lower reaction temperatures than the melting point of the starting material at the initial stage, generally at about 50° to about 80° C., specifically though dependent on a degree of polymerization n. Then, in the progress of reaction, the reactivity will be lowered. To effectively carry out the reaction, the reaction temperature must be slowly elevated in the progress of reaction, and finally the reaction is carried out at about 100° to about 120° C. to complete the fluorination reaction. Actually, it must be determined by NMR at the intermediate stage of the fluorination reaction that a ratio of —$CH_2$— to —CHF— in the reaction mixture become 1:1, and then the reaction temperature must be slowly elevated to 100°-120° C. by heating and kept at that temperature for about 40 to about 160 hours before completing the fluorination reaction.

The fluorination reaction with a fluorine gas is a gas-liquid reaction. Thus, it is important to conduct the reaction with smaller, thoroughly dispersed fluorine gas bubbles produced by vigorous stirring or with smaller fluorine gas bubbles produced through micro capillaries. Fluorine gas can be used alone, but can be generally used by dilution of about 1 to about 20 parts by volume of an inert gas, preferably a nitrogen gas, on the basis of one part by volume of the fluorine gas.

As reactor materials to be used in the fluorination reaction, copper, silver, and nickel are suitable not only because of the corrosion resistance or heat conduction, but also because of effectively progress of mild fluorination reaction controlled by the actions of fluorides and perfluorides formed on the reactor surface. Copper alloy, silver alloy, nickel alloy, or silver-plated copper, or nickel, etc. can be also used. At flexibility-requiring positions in the reactor, polytetrafluoroethylene, tetrafluoroethylene-perfluoro(alkyl vinyl ether) copolymer, tetrafluoroethylene-hexafluoropropylene copolymer, polychlorotrifluoroethylene, ethylene-trifluoroethylene copolymer, perfluoroelastomer, etc. can be used. At joint parts or seal parts, fluorine-based grease or fluoro oil is preferably used as an auxiliary material.

It is preferable to provide the reactor with a cooling jacket or an internal cooling coil for temperature control, capillaries for feeding a fluorine (mixed) gas, a stirrer for dispersing the gas, desirably with a buffer plate for improving the dispersion, a condenser or a receptacle for recovering volatile matters, reaction media, reaction product, raw materials etc., and a transfer line for returning the recovered materials to the reactor, if required. It is preferable that at least of the surfaces of not only the reactor, but also the stirrer, condenser, cooling coil, etc. are made of a metal such as copper, silver, nickel, etc., where copper or silver is preferable owing to good heat conduction, and rapid removal of the heat of reaction, and copper or nickel is costwise practical.

The desired product F($CF_2CF_2CF_2O$)n$CF_2CF_2$COF resulting from the fluorination reaction can be converted to stable F($CF_2CF_2CF_2O$)n-$C_2F_5$ in high yield, for example, by the reaction with a fluorine gas at a temperature of about 150° C. or more, preferably about 200° to about 300° C., To elevate the reaction temperature for terminal group stabilization reaction, it is desirable to remove dissolved hydrogen fluoride from F($CF_2CF_2CF_2O$)n$CF_2CF_2$COF before the temperature elevation. Removal of hydrogen fluoride can be attained in various manners, for example, by using a hydrogen fluoride trapping agent or by purging with an inert gas. By-product of the fluorination reaction is carbonyl fluoride $COF_2$ without any by-production hydrogen fluoride, and thus not only a reactor of the afore-mentioned materials, but also a glass reactor can be used. The perfluoropolyether, whose terminal group is converted to an inactive group as described above, can be widely used in the field of vacuum pump oil, grease, etc.

EXAMPLES

The present invention will be described in detail below, referring to Examples.

Example 1

The following compounds were charged into a 300 ml metallic reactor with stirring blades, and the inside temperature was kept at 100° C. with stirring.

| | |
|---|---|
| F(CH$_2$CF$_2$CF$_2$O)nCH$_2$CF$_2$COF (n: average 40.0) | 80 g |
| CF$_3$CF$_2$CF$_2$O[CF(CF$_3$)CF$_2$O]nC$_2$F$_5$ (n: 3-6) | 250 g |

Then, the temperature was slowly lowered to 70° C., and then a mixed gas of F$_2$—N$_2$ (1:4 in volume ratio) was added thereto by bubbling at a flow rate of 100 ml/min. to start the reaction.

When it was confirmed by NMR that a ratio of —CH$_2$— to —CHF— became 1:1 in the reaction mixture in the course of reaction, the reaction temperature was slowly elevated to 100° C. by heating, and the reaction was continued at that temperature for about 70 hours. End point of the reaction was confirmed by NMR. After the completion of the reaction, the reaction mixture was subjected to subatmospheric distillation to distill off the solvent, etc., whereby 89.9 g of the following desired product was obtained (yield: about 88%):

F(CF$_2$CF$_2$CF$_2$O)$_n$CF$_2$CF$_2$COF (n: average 37.2)

Example 2

The following compounds were charged into a 300 ml metallic reactor with stirring blades, and the inside temperature was kept at 100° C. with stirring:

| | |
|---|---|
| F(CH$_2$CF$_2$CF$_2$O)nCH$_2$CF$_2$COF (n: average 41.2) | 0.8 kg |
| CF$_3$CF$_2$CF$_2$O[CF(CF$_3$)CF$_2$O]nC$_2$F$_5$ (n: 3-6) | 2.5 kg |

Then, the temperature was slowly lowered to 70° C., and then a mixed gas of F$_2$—N$_2$ (1:4 in volume ratio) was added thereto by bubbling at a flow rate of 500 ml/min. to conduct the reaction.

When it was confirmed by NMR that a ratio of —CH$_2$— to —CHF— became 1:1 in the reaction mixture in the course of reaction, the reaction temperature was slowly elevated to 110° C. by heating, and the reaction was continued for about 152 hours. End point of the reaction was confirmed by NMR. After the completion of the reaction, the reaction mixture was subjected to subatmospheric distillation to distill off the solvent, whereby 0.91 kg of the following desired product was obtained (yield: about 89%):

F(CF$_2$CF$_2$CF$_2$O)$_n$CF$_2$CF$_2$COF (n: average 39.0)

Example 3

In Example 1, the reaction was conducted by further adding 25.8 g of NaF thereto, and after the completion of the reaction the reaction mixture was subjected to pressure filtration to separate NaF, followed by distillation, whereby 93.2 g of the desired product (n: average 38.9) was obtained (yield: about 91%).

Example 4

In Example 1, the following compound was used as a solvent in place of hexafluoropropene oxide trimer-hexamer:

| | |
|---|---|
| F(CF$_2$CF$_2$CF$_2$O)nC$_2$F$_5$ (n: 6-8) | 250 g | whereby 95.1 g of the following desired product was obtained (yield: about 93%):

F(CF$_2$CF$_2$CF$_2$O)$n$CF$_2$CF$_2$COF (n: average 39.5)

Comparative Example

The following compound was charged into a 300 ml metallic reactor with stirring blades:

| | |
|---|---|
| F(CH$_2$CF$_2$CF$_2$O)nCH$_2$CF$_2$COF (n: average 40.0) | 160 g | and then the inside temperature was slowly elevated from 100° C. to 120° C. with stirring, followed by adding a mixed gas of F$_2$—N$_2$ (1:4 in volume ratio) thereto by bubbling at a flow rate of 200 ml/min. to conduct reaction. The reaction was continued for about 50 hours, and end point of the reaction was confirmed by NMR, whereby about 138 g of the following desired product was obtained (yield: about 68%):

F(CF$_2$CF$_2$CF$_2$O)$n$CF$_2$CF$_2$COF (n: average 25.4)

Reference Example 1 kg of the product obtained in Example 2 was charged into a 1 L glass reactor, and the inside temperature was kept at 240° C. with stirring. A mixed gas of F$_2$—N$_2$ (1:4 in volume ratio) was added thereto by bubbling at a flow rate of 100 ml/min. to conduct reaction. The out gas from the reactor was analyzed by IR, and the reaction was continued for about 25 hours until no peak of formed CF$_2$O was detected. It was confirmed from the result of NMR analysis that 0.97 kg of the following desired product was obtained (yield: about 97%):

F(CF$_2$CF$_2$CF$_2$O)$n$C$_2$F$_5$ (n: average 39.0)

The invention claimed is:

1. A process for producing perfluoropolyether carboxylic acid fluoride having the following general formula:

F(CF$_2$CF$_2$CF$_2$O)$_n$CF$_2$CF$_2$COF (where n is an integer of 2-200), which process comprises starting fluorination reaction of polyfluoropolyether carboxylic acid fluoride having the following general formula:

F(CH$_2$CF$_2$CF$_2$O)$_n$CH$_2$CF$_2$COF (where n is an integer of 2-200) in a dispersed state in a perfluoropolyether-based solvent with a fluorine gas at 50°-80° C., slowly elevating the fluorination reaction temperature, and finally completing the fluorination reaction at 100°-120° C.

2. A process for producing perfluoropolyether carboxylic acid fluoride according to claim 1, wherein, when a ratio of —CH$_2$— to —CHF— is confirmed to be 1:1 in the reaction mixture in the course of the reaction, the reaction temperature is elevated to 100°-120° C. by heating to further conduct the fluorination reaction.

3. A process for producing perfluoropolyether carboxylic acid fluoride according to claim 1, wherein the polyfluoropolyether carboxylic acid fluoride and the perfluoropolyether-based solvent are charged together into a reactor, and heated to a higher temperature than the melting point of the carboxylic acid fluoride under stirring conditions to once dissolve the carboxylic acid fluoride into the solvent, and then the temperature of the resulting solution is slowly lowered to the melting point or less, thereby dispersing the carboxylic acid fluoride into the solvent.

4. A process for producing perfluoropolyether carboxylic acid fluoride according to claim 1 wherein the perfluoropolyether-based solvent is a hexafluoropropene oxide polymer represented by the following general formula:

$$CF_3CF_2CF_2O[CF(CF_3)CF_2O]_nCF(CF_3)X$$

(where X is an F atom or COF group, and n is an integer of 2-30), a perfluoropolyether represented by the following general formula:

$$F(CF_2CF_2CF_2O)_nCF_2CF_2Y$$

(where Y is an F atom or COF group, and n is an integer of 2-30), or derivative thereof.

5. A process for producing perfluoropolyether carboxylic acid fluoride according to claim 2, wherein the perfluoropolyether-based solvent is a hexafluoropropene oxide polymer represented by the following general formula:

$$CF_3CF_2CF_2O[CF(CF_3)CF_2O]_nCF(CF_3)X$$

(where X is an F atom or COF group, and n is an integer of 2-30), a perfluoropolyether represented by the following general formula:

$$F(CF_2CF_2CF_2O)_nCF_2CF_2Y$$

(where Y is an F atom or COF group, and n is an integer of 2-30), or derivative thereof.

6. A process for producing perfluoropolyether carboxylic acid fluoride according to claim 3, wherein the perfluoropolyether-based solvent is a hexafluoropropene oxide polymer represented by the following general formula:

$$CF_3CF_2CF_2O[CF(CF_3)CF_2O]_nCF(CF_3)X$$

(where X is an F atom or COF group, and n is an integer of 2-30), a perfluoropolyether represented by the following general formula:

$$F(CF_2CF_2CF_2O)_nCF_2CF_2Y$$

(where Y is an F atom or COF group, and n is an integer of 2-30), or derivative thereof.

7. A process for producing perfluoropolyether carboxylic acid fluoride according to claim 1, wherein the fluorination reaction is carried out in the presence of an alkali metal fluoride as a hydrogen fluoride-trapping agent.

8. A process for producing perfluoropolyether carboxylic acid fluoride according to claim 2, wherein the fluorination reaction is carried out in the presence of an alkali metal fluoride as a hydrogen fluoride-trapping agent.

9. A process for producing perfluoropolyether carboxylic acid fluoride according to claim 1, wherein the fluorine gas is used as diluted to not more than 50% by volume by an inert gas.

10. A process for producing perfluoropolyether carboxylic acid fluoride according to claim 1, wherein $F(CF_2CF_2CF_2O)_nCF_2CF_2COF$ having n=35-70 is produced.

* * * * *